J. C. BARBER.
CAR TRUCK.
APPLICATION FILED SEPT. 12, 1910.
980,739.
Patented Jan. 3, 1911.
5 SHEETS—SHEET 1.
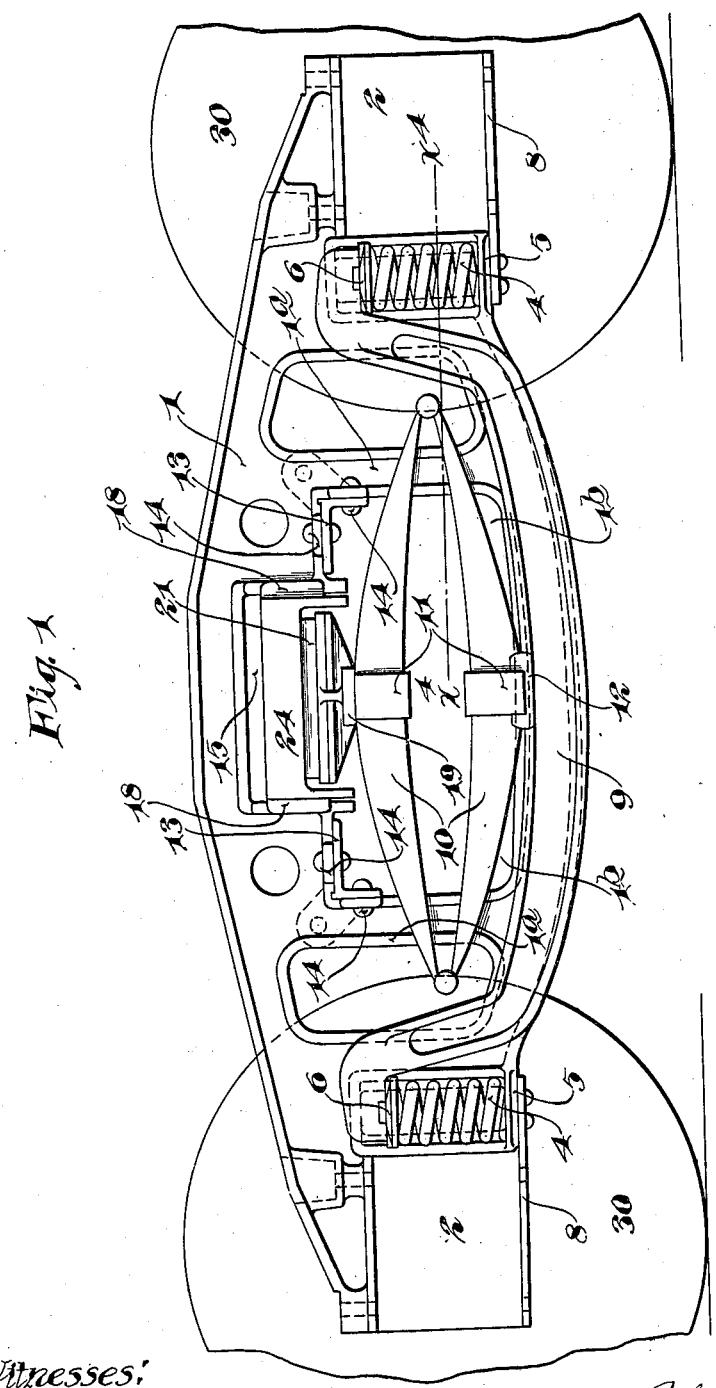
Witnesses:
E. C. Skinkle
Harry Opsahl.
Inventor:
John C. Barber
By his Attorneys,
Williamson Merchant

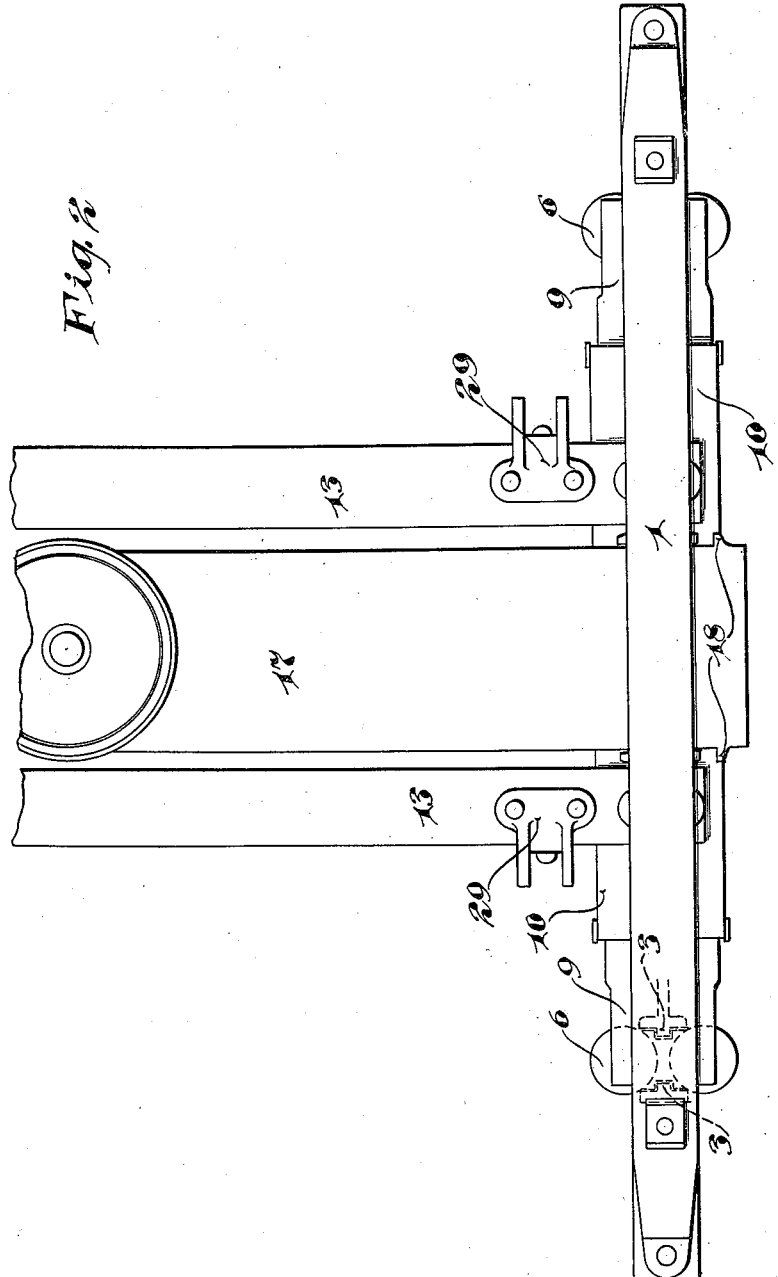

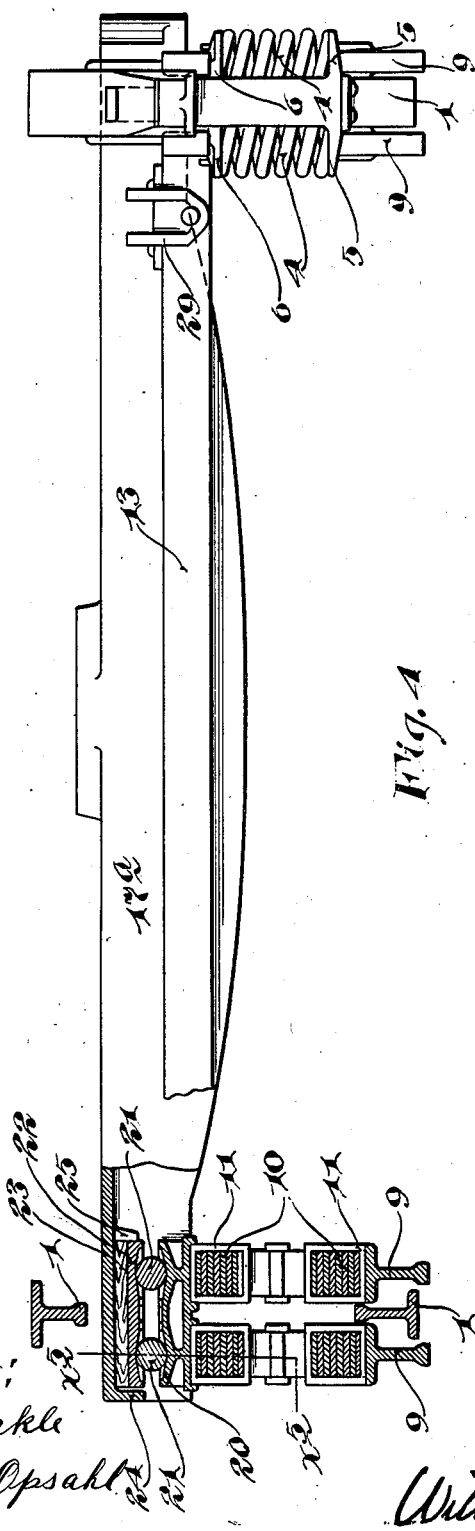

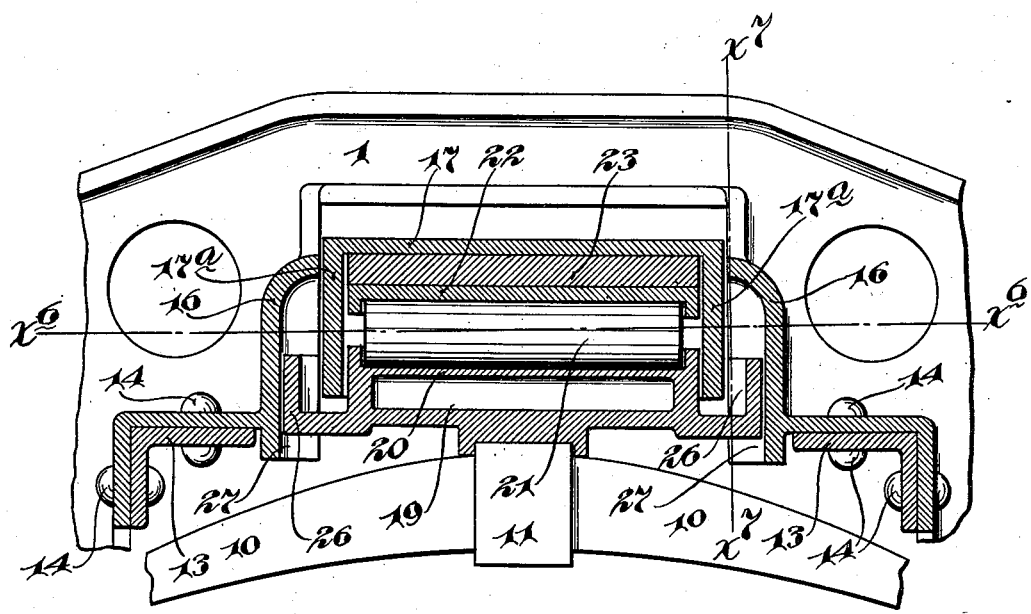

J. C. BARBER.
CAR TRUCK.
APPLICATION FILED SEPT. 12, 1910.

980,739.

Patented Jan. 3, 1911.
5 SHEETS—SHEET 5.

Witnesses:
E. C. Skinkle
Harry Opsahl.

Inventor:
John C. Barber.
By his Attorneys;
Williamson Merchant

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CAR-TRUCK.

980,739.        Specification of Letters Patent.        Patented Jan. 3, 1911.

Application filed September 12, 1910. Serial No. 581,675.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention has for its object to provide an improved car truck, and to this end the invention consists of the novel devices and combinations of devices hereinafter described and defined in the claims.

In the accompanying drawings which illustrate the invention, like characters indicate like parts throughout the several views.

Figure 6:
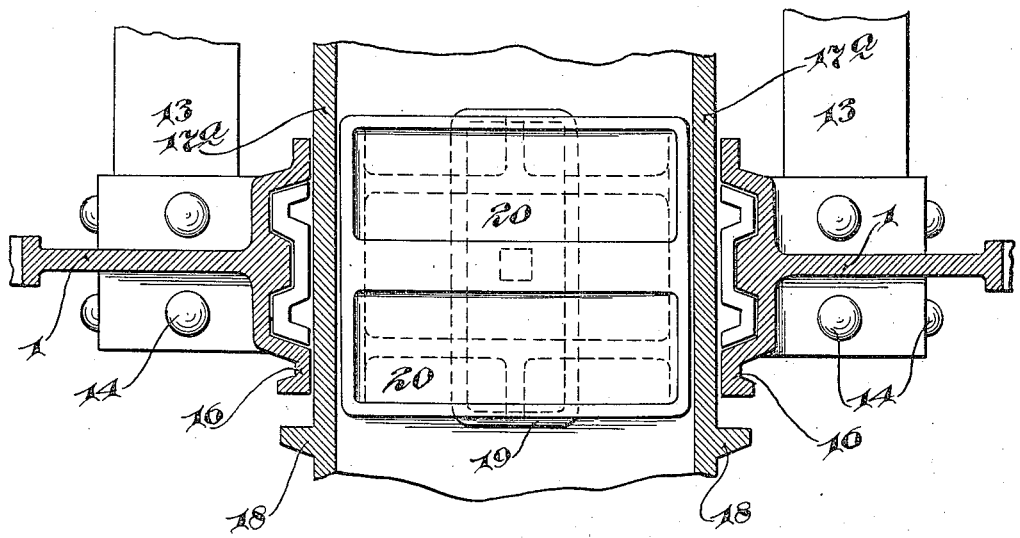
Figure 7:
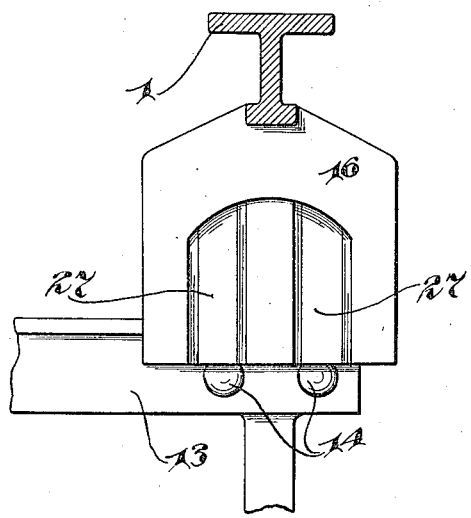

Referring to the drawings; Figure 1 is a view in side elevation with some parts broken away and some parts removed, showing the improved truck; Fig. 2 is a plan view showing approximately one-half of the truck, the wheels thereof being removed; Fig. 3 is a view partly in elevation and partly in transverse vertical section showing the truck frame with the wheels removed; Fig. 4 is a horizontal section taken approximately on the line $x^4$ $x^4$ of Fig. 1, the springs being removed and some parts being broken away; Fig. 5 is a vertical section taken approximately on the line $x^5$ $x^5$ of Fig. 3, some parts being broken away and some parts being shown in full; Fig. 6 is a horizontal section taken approximately on the line $x^6$ $x^6$ of Fig. 5, some parts being removed and some parts being broken away; and Fig. 7 is a detail in transverse vertical section taken approximately on the line $x^7$ $x^7$ of Fig. 5, some parts being removed and some parts being broken away.

The truck side frames 1, which are advisably of cast steel, are preferably formed so that the various parts thereof have T-rail cross-sections, and their ends are arranged to rest directly upon freight journal boxes 2 of the Master Carbuilders' type, and just inward of the said boxes, said side frames are formed with vertical recesses for the reception of equalizer spring devices that support equalizing bars. As preferably constructed, these recesses are formed between vertically extended centrally ribbed guides 3, the outer of which bear directly against the boxes 2. One, or more, equalizer springs may be employed in each of the above noted openings, but preferably, these equalizer springs are arranged in pairs and are in the form of heavy coiled springs 4, that rest upon spring bases afforded by laterally projected portions 5, of the side frames 1. Spring caps 6 rest upon the equalizer springs and are notched at their front and rear edges so that they are guided for vertical movements by the ribbed guides 3. These spring caps 6, as is evident, span the coöperating springs and project, both at the inner and outer sides of the truck frames.

Tie straps or bars 8 for application to the bottom of the journal boxes, are rigidly secured to the lower end portions of the truck side frames, in any suitable way, but are preferably riveted thereto, as shown in the drawings. The ordinary vertically extended journal box bolts, not shown, are adapted to be passed vertically through the tie bars 8, the journal box lugs and the upper projecting ends of the side frames.

The T-rail section side frames are each connected to two inverted T-rail section equalizing bars 9, the said equalizing bars or equalizers being located, one just inside and the other outside of the central portions of the said side frames, with their ends seated upon and interlocked with the projecting portions of the equalizer spring caps 6. Each equalizer 9 carries a bolster supporting spring, which springs act in pairs, and are preferably of the elliptical type. These elliptical springs 10 are provided with the customary hubs or bands 11, the lower of which rest in suitable seats 12 formed for the reception thereof on the central portions of the equalizing bars 9. Transversely reduced, vertically extended strut forming portions $1^a$ of the side frames 1 are located between the end portions of the inner and outer springs 10, as best shown in Figs. 1 and 4. Between the struts $1^a$ the said side frames are formed with large openings $1^b$, in the upper corners of which the ends of angle bar transoms or cross ties 13 are rigidly secured, preferably by rivets 14 applied to the inner and outer flanges of the said side frames and to the vertical and horizontal flanges of the said transoms. Between the transoms 13 the side frames are formed with bolster passages 15 that open at their lower portions into the large openings 1ᵇ but are of considerable less width than the latter.

At the front and rear portions of the bolster passages 15 the side frames are formed with quite short vertically extended bolster guiding columns 16 that are made considerably wider than the said side frames and are, in themselves, of a novel construction presently to be described.

The truck bolster 17, at its ends, projects through the bolster passages 15 and is formed with depending wearing flanges 17ª that engage the inner face of the bolster guiding columns or surfaces 16. Stop lugs 18 on the sides of the bolster are engageable with the outer edges of the bolster columns 16, to limit the endwise movements of said bolster.

Seated on the upper hubs or bands 11 of each pair of elliptical springs 10 is a combined spring cap and roller base 19 provided with concave seats 20, in which rollers 21 are seated. On each pair of rollers 21 is a roller cap 22 provided with concave seats for engagement with the rollers. Shimming blocks 23 are, as shown, interposed between the roller caps 22 and the end portions of the horizontal web of the truck bolster. The depending flanges 17ª, depending end flanges 24 and depending lugs 25, all on the said truck bolster, afford seats that receive the shimming blocks 23 and roller caps 22 and hold the same against movements both endwise and transversely of the said bolster. Otherwise stated, the said parts 22 and 23 are held for traveling movements with the bolster transversely of the truck. From what has been said, it, of course, follows that the truck bolster is mounted for endwise traveling movements transversely of the truck and is yieldingly held in an intermediate or central position by gravity acting through the rollers 21 and coöperating concave seats of the combined spring cap and roller base 19 and of the spring cap 22.

To provide a maximum bearing surface in the wearing flanges 17ª of the truck bolster, and in the coöperating friction engaging surface of the spring cap and roller base 19 and columns 16, the said parts are preferably constructed as follows: The said flanges 17ª are extended down to a point considerably below the bottom of the rollers 21, and the spring caps and roller base 19 are formed at front and rear with extensions that extend horizontally under the lower edges of the said flanges 17ª, and at points outside of the said flanges 17ª are provided with upwardly extended wearing flanges 26 that overlap, vertically, the said flanges 17ª and engage recessed bearing surfaces 27 of the bolster columns 16. Otherwise stated, the lower edges of the bolster flanges 17ª work in grooves or clearance channels formed in the main and end portions of the combined spring caps and roller bases 19.

To hold the combined spring caps and roller bases 19 against movements transversely of the truck, but free for vertical movements, and at the same time to increase the extent of the frictionally engaging surface of the parts 16 and 26, both of the said parts, in horizontal cross-section, are made of zigzag form, that is, are provided with interlapping grooves and ribs having frictional engagement indicated in Fig. 6. By this construction also, (see particularly Figs. 5 and 6), the engagement between the said parts 16 and 26 is entirely within the former and thereby a bolster column of maximum width and bearing roller 21 of maximum length are made possible.

The transoms 13 are so positioned that they afford constant supports to which the break hanger brackets 29 are applied just inside of the truck side frames 1.

By the inverted or alternated and interlapped arrangement of the T-rail portions of the side frames 1, and of the equalizing bars 9, a very compact, and at the same time, a very strong construction is afforded. The truck wheels 30 are indicated in diagram only in Fig. 1. The journal box 2 may be separated from the truck side frames, when the box bolts are removed, simply by moving the same laterally in a direction away from the central portion of the truck. It will also be noted that the transoms 13 are attached to the side frames 1, approximately in a horizontal line with the truck bolster, so that the lateral shocks, due to engagement of the bolster lugs 18 with the bolster columns 16, will be transmitted almost directly to the said transoms and without producing strains in the side frames which tend to rock or tilt the same out of vertical planes.

What I claim is:

1. In a car truck, the combination with side frames and journal boxes applied to the ends thereof, of equalizer springs applied to the said side frames just inward of said journal boxes, equalizer bars resting on said equalizer springs, a truck bolster having its ends guided by said side frames, and springs supporting said bolster from said equalizer bars.

2. In a car truck, the combination with side frames and journal boxes applied to the ends thereof, of equalizer springs applied in pairs to said side frames just inward of said journal boxes and on both sides of said side frames, equalizer bars applied in pairs to the said pairs of equalizer springs and on both sides of said side frames, a truck bolster guided at its ends by said side frames, and springs supporting said bolster from said equalizer bars.

3. In a car truck, the combination with side frames and journal boxes applied to the ends thereof, of equalizer springs applied in pairs to said side frames just inward of said journal boxes and on both sides of said side frames, equalizer bars applied in pairs to said pairs of equalizer springs and on both sides of said side frames, a truck bolster guided at its ends by said side frames, and elliptical springs arranged in pairs and on both sides of said side frames for supporting said bolster from said equalizer bars.

4. In a truck, the combination with the side frames and equalizer springs applied thereto, of equalizer bars supported by said equalizer springs, the said equalizer bars and lower members of said side frames having reversely arranged interlapping T-rail sections, a truck bolster guided by said side frames, and springs supporting said bolster from said equalizer bars.

5. In a car truck, the combination with side frames and journal boxes applied to the ends thereof, side frames having spring cap guides just inward of said journal boxes, vertically movable laterally projecting spring caps guided by said cap guides, pairs of coiled springs interposed between said spring caps and said side frames, pairs of equalizer bars resting on said spring caps and arranged on both sides of said side frames, a truck bolster guided by said side frames and springs supporting said bolster from said equalizer bars.

6. In a car truck, the combination with truck side frames having bolster guiding surfaces, of a truck bolster having depending flanges engageable with the guiding surfaces of said side frames, bolster supporting springs carried by said side frames, combined spring caps and roller bases carried by said springs and provided with angular ends that extend outward of and above the flanges of said bolster and are guided for vertical movements by the bolster guiding surfaces of said side frames, and rollers carrying said bolster on said combined spring caps and roller bases with freedom for endwise movements transversely of the truck.

7. In a car truck, the combination with side frames having bolster guiding surfaces formed with vertical grooves, of bolster supporting springs carried by said side frames, of combined spring caps and roller bases carried by said springs and provided at their ends with vertically grooved wearing surfaces that are interlapped with the grooves of said bolster guiding surfaces, lateral motion rollers on said spring caps and roller bases, and a truck bolster mounted on said rollers for endwise movements transversely of the truck.

8. In a car truck, the combination with side frames, of equalizer springs carried by said side frames, equalizer bars resting on said equalizing springs, a truck bolster having its ends guided by the said side frames, and springs independent of the said equalizer springs, supporting the said bolster from said equalizing bars.

In testimony whereof I affix my signature in presence of two witnesses.

JOHN C. BARBER.

Witnesses:
 Ly. W. Barber,
 M. Belle Barber.